J. T. SWINT.
TIRE PATCH.
APPLICATION FILED JUNE 25, 1915.

1,294,322.

Patented Feb. 11, 1919.

Witnesses

Inventor
J. T. Swint,
By _____ Attorney

UNITED STATES PATENT OFFICE.

JAMES T. SWINT, OF WRENS, GEORGIA.

TIRE-PATCH.

1,294,322.  Specification of Letters Patent.  Patented Feb. 11, 1919.

Application filed June 25, 1915. Serial No. 36,261.

*To all whom it may concern:*

Be it known that I, JAMES T. SWINT, a citizen of the United States, residing at Wrens, in the county of Jefferson and State of Georgia, have invented certain new and useful Improvements in Tire-Patches; and I do hereby declare the following to be a full, clear, and exact description of the invention, such as will enable others skilled in the art to which it appertains to make and use the same.

This invention relates to tire patches and has for its primary object to provide a tire patch of efficient and inexpensive construction embodying essentially a pair of clamping plates and a bolt or equivalent means for drawing the plates together and reliably clamping the same in position upon the casing of a pneumatic tire for effectively closing punctures or blow-outs.

Another object is the provision of a blow-out patch for pneumatic tires in which one of the clamping plates is formed with a depression shaped conformably with and the same size as the other plate so as to increase the clamping efficiency of the plates upon the tire casing.

With these and other objects in view, the invention consists in the novel construction, arrangement and formation of parts as will be hereinafter specifically described, claimed and illustrated in the accompanying drawing, in which:

Figure 1:
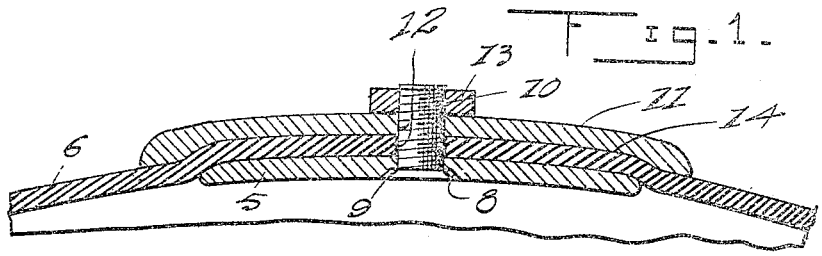
Figure 1 represents a sectional view through a fragment of a pneumatic tire illustrating the improved patch applied to use.
Figure 2:
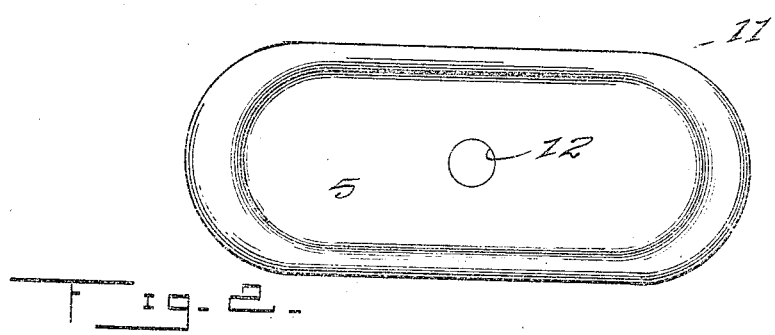
Fig. 2 represents a plan view of the inside of the outer clamping plate.
Figure 3:
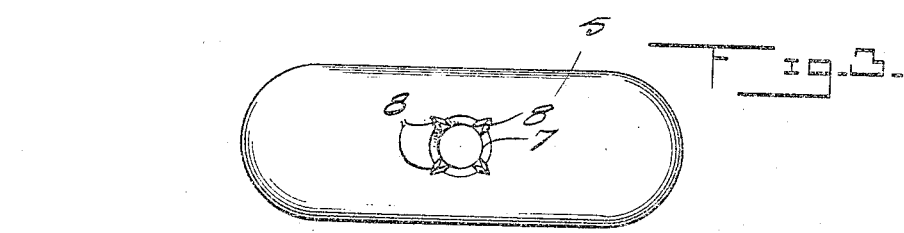
Fig. 3 represents a plan view of the inner clamping plate removed.
Figure 4:
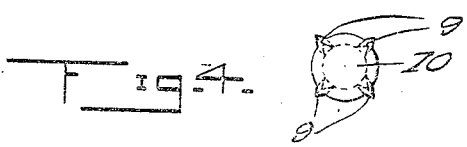
Fig. 4 represents an end elevation of the clamping bolt removed.

Referring to the drawing in detail, wherein similar reference numerals designate corresponding parts throughout the several views, the numeral 5 indicates the inner clamping plate which is curved conformably with the inner surface of a pneumatic tire casing 6 and is formed with a central aperture 7 having a plurality of radiating recesses 8 in the edge thereof which are beveled and adapted to receive the spurs 9 formed at one end of the bolt shank 10 to lock the latter against rotational movement in the plate 5. The outer clamping plate 11 is shaped conformably with the inner plate, but is of greater size than the latter and is formed with a central aperture 12 adapted to receive the free end of the bolt shank 10. A nut 13 is fitted upon the bolt 10 and is adapted to be advanced against the outer clamping plate 11 to move the latter inwardly into clamping engagement with the tire 6, as clearly illustrated in Fig. 1.

The inner surface of the outer plate 11 is formed with a substantially oval shaped depression or cavity 14 having inclined walls 14$^a$ snugly receiving the plate 5, which latter is formed with rounded ends and edges designed to firmly clamp the tire casing without creasing, cutting or otherwise injuring the latter. The rounded edges and ends of the plate 5 further insure against injury to the inner tube of the tire which engages therewith.

While I have here shown the tire patch of an elongated formation and shaped to fit a tire casing circumferentially, it will be understood that the patch may be made in any desired shape so as to adapt it for use in repairing punctures or blow-outs of various sizes and in various positions upon the tire casing.

What I claim is:—

A tire patch including an outer substantially rectangular metallic clamping plate curved longitudinally to conform to the curvature of a tire and having a substantially oval shaped depression in its concave surface provided with inclined side walls, an inner substantially rectangular clamping plate curved longitudinally and having rounded ends, said inner plate being adapted to snugly fit into said depression and having rounded edges adapted to clamp a tire casing against the inclined walls of said depression, and means carried by said inner clamping plate for securely clamping the plates together.

In testimony whereof I affix my signature in presence of two witnesses.

JAMES T. SWINT.

Witnesses:
 JAMES W. HOBBS,
 JOHN D. REESE.